United States Patent [19]
Maurice et al.

[11] 3,737,205
[45] June 5, 1973

[54] SEALING DEVICE FOR A SCREWTHREADED CONNECTION AND APPLICATIONS THEREOF

[75] Inventors: Jean Maurice, St-Germain de La Grange; Andre Mouttet, Bois D'Arcy, both of France

[73] Assignees: Automobiles Peugot, Paris; Regie Nationale Des Usines Renault, Billancourt, France

[22] Filed: July 1, 1971

[21] Appl. No.: 158,864

[30] Foreign Application Priority Data
July 30, 1970 France.................................7028139

[52] U.S. Cl. ........................................308/207 A
[51] Int. Cl. .............................................F16c 33/76
[58] Field of Search............................308/207, 236

[56] References Cited
UNITED STATES PATENTS
1,617,265  2/1927  Melanowski........................308/207

Primary Examiner—Milton Kaufman
Assistant Examiner—Frank Susko
Attorney—Burns, Doane, Swecker & Mathis

[57] ABSTRACT

Sealing device affording a fluidtight seal between an outer member having an inner screwthread and an inner member having an outer screwthread in engagement with the inner screwthread. The device consists of a plug disposed in a radial aperture in the outer member and compressed directly against the outer screwthread by plug-compressing means fixed in the aperture.

4 Claims, 5 Drawing Figures

PATENTED JUN 5 1973 3,737,205
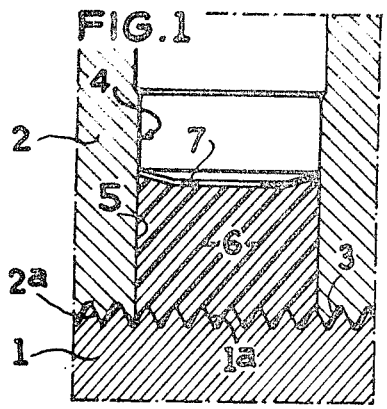
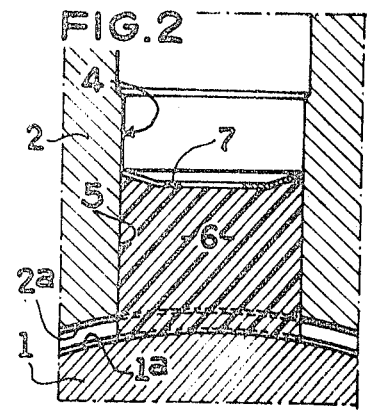
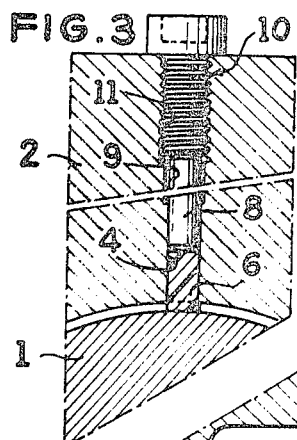
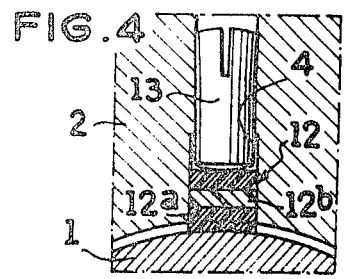
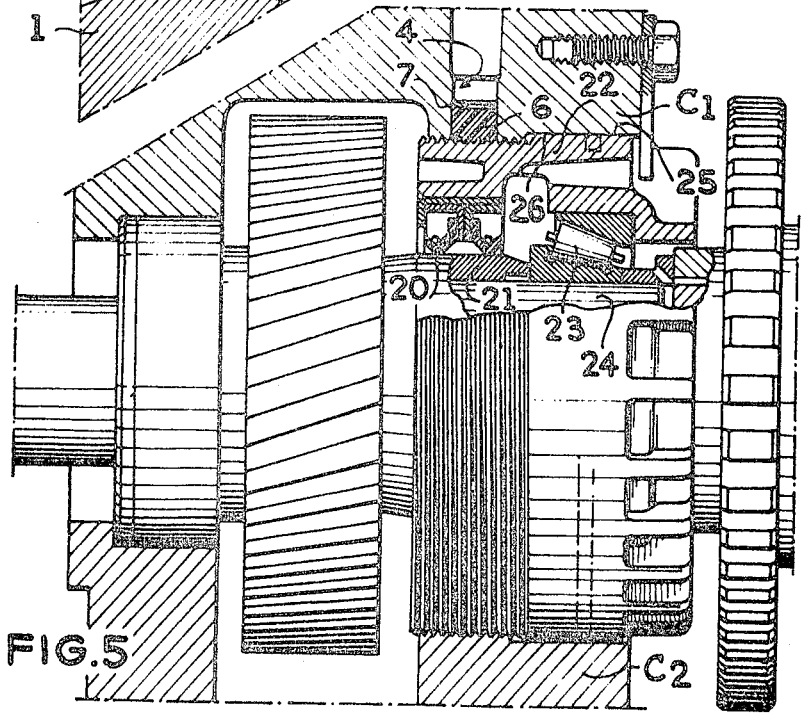

SEALING DEVICE FOR A SCREWTHREADED CONNECTION AND APPLICATIONS THEREOF

The present invention relates to devices affording a fluidtight seal between interengaged screwthreaded inner and outer members.

There is usually employed for affording a fluidtight seal between screwthreaded inner and outer members either O-section sealing rings disposed between non-screwthreaded extensions of these members or fluidtight materials injected between the screwthreads, these materials being adhesive or suitable plastics materials. However, these two known sealing means have the following main drawbacks:

The O-section ring must of necessity be interposed between two non-screwthreaded extensions of the members which is not always possible. Further, in some cases, assembly difficulties may be encountered, as will be understood from the ensuing description.

As concerns the injection of an adhesive or plastics material between the screwthreads of the assembled members, it does not allow an easy removal or dismantling of one of the two members and is therefore unacceptable in some cases.

An object of the invention is to provide a device which affords a satisfactory fluidtight seal between two members having respectively an inner and outer screwthread, said device being easy to place in position and remove and acting directly on the screwthreads of the two members and not on smooth extensions of the latter.

The invention provides a device comprising a radial aperture which is formed in the member having an inner screwthread and communicates with the inner and outer periphery of the member, a plug of compressible material disposed in said aperture and first means for compressing and retaining the plug and cooperating with complementary second means provided in said aperture.

This plug can be made of rubber having a relatively low or medium hardness or of plastics material such as Neoprene or other material, preferably having a closed cellular structure.

The retaining means may comprise a resiliently yieldable metal washer cooperating with a radial abutment provided in the aperture, a screw bearing directly or indirectly on the plug or any other suitable means.

Further features and advantages of the invention will be apparent from the ensuing description with reference to the accompanying drawings.

In the drawings:

FIG. 1 is a diagrammatic sectional view of a device according to the invention;

FIG. 2 is a cross-sectional view taken along line 2—2 of FIG. 1;

FIGS. 3 and 4 are views similar to FIG. 2 of two modifications of the device according to the invention, and FIG. 5 is a partial sectional view of a transmission unit for a vehicle including the device according to the invention.

FIGS. 1 and 2 show a first embodiment of the device according to the invention arranged to afford a fluidtight seal between a male member 1 having an outer screwthread $1^a$ and a female member 2 having an inner screwthread $2^a$. The screwthreads of the two members define therebetween a helical leakage path 3 whose radial width has been exaggerated for purposes of clarity. The device affording the seal comprises an aperture 4 extending between the outer and inner peripheries of the member 2, this aperture having a part 5 in which is received a pad or plug 6 of compressible material which is held in position by means of a resiliently yieldable metal washer 7 whose peripheral edge is wedged against the wall of the aperture 4.

The material of the plug 6 can be composed, for example, of rubber having a low or medium hardness, for example about 40 Shore units, or of a plastics material having a closed cellular structure, such as cellular Neoprene. It must be understood that these materials have been indicated merely by way of non-limitative examples.

The plug 6 is placed in position very easily by engaging the plug in the inner end of the aperture 4 and then inserting the washer 7 by means of a suitable tool until the washer sufficiently compresses the plug 6. Under the effect of the force exerted by the washer 7, the material 6 is compressed and fits round or marries up with the threads $1^a$ by penetrating to the roots of these threads. In this way, the helical leakage path defined by the screwthreads $1^a$ and $2^a$ is closed or sealed in as many places as there are screwthreads engaged by the plug 6 (FIG. 1).

It will be understood that if it is desired to remove or shift one of the members 1 and 2 with respect to the other, it is easy to merely extract the washer 7 and then the plug 6.

Although this is not the essential function of the device, the two members are also braked against relative rotation therebetween, which might be an advantageous feature.

FIGS. 3 and 4 show other embodiments of a device according to the invention.

FIG. 3 shows means employed for compressing and retaining the plug of compressible material which are constituted by a pushrod 8 guided in a cylindrical portion 9 of the radial aperture 4 and a screw 10 which cooperates with an outer screwthreaded portion 11 of the aperture 4. It will be understood that the result is identical to that of the first embodiment, with the additional advantage that the compressing force exerted on the sealing material of the plug 6 may be varied.

In the embodiment shown in FIG. 4, the plug means of compressible material comprises a plurality of washers such as $12^a$, $12^b$, ... which are retained in the inner end of the aperture 4 by a split pin 13 which is a force fit in the aperture 4.

In the specific application shown in FIG. 5, the device according to the invention is adapted to participate in the sealing between a casing of a gear change mechanism (not shown) and a casing ($C_1$, $C_2$) of a differential in an automobile vehicle transmission device. In such a transmission device, it is essential that the seal between the two casings be excellent since oils of different qualities and characteristics are employed in the casings. Although the seal is relatively easy to achieve by means of sealing rings 20 having lip or flange portions of suitable section in the region of spacer members, such as the spacer member 21, it is more difficult in the region of the screwthreaded assembly between a screwthreaded element 22 and the differential casing $C_2$ for the following reasons. This screwthreaded element is intended to regulate the axial pre-stressing to which the roller bearings having tapered rollers, such as 23, are subjected. These bearings support the output shaft 24 of the transmission. In order to eliminate any parasite torque which might harm the precision of the regulation, the sealing device must be mounted after the regulation has been effected.

As can be seen in FIG. 5, the casing is made in two parts ($C_1$, $C_2$) which are assembled along a diametral joint plane. The known arrangement of sealing by means of an O-section sealing ring (shown in dot-dash line) disposed in a groove in the cylindrical portion 25 of the screwthreaded element 22, requires an axial position of the element 22 which is such that the O-section sealing ring is located outside the bore 26 of the casing when assembling the two half-casings, the sealing being placed in its correct axial in the bore 26 by screwing the element 22. Indeed, when assembly the half-casings, it is possible to localize the element 22 in such manner that the sealing ring be directly engaged in the bore 26 since there is a risk of wedging the sealing ring between the two half-casings when closing them together and damaging it when shifting the regulating element 22. It is therefore clear that this conventional sealing device requires a greater axial overall size than that possible when employing the device according to the invention. Moreover, it will be understood that if the sealing device is to be easily removable, it excludes the use of a sealing material such as a plastics material or an adhesive which is injected to remain permanently between the screwthreaded element and the casing.

Thus it is clear that the utilization of a sealing device according to the invention in the part of the casing in which the screwthreaded element 22 is engaged, affords a solution to the various problems mentioned hereinbefore in a particularly efficient and economical manner.

It must be understood that the cross-sectional shape of the aperture 4, the material of the plug 6 and the means for compressing and retaining the plug may be modified to suit the specific application.

Having now described our invention what we claim and desire to secure by Letters Patent is:

1. A transmission device for an automobile vehicle comprising a casing, a shaft, a set of roller bearings having tapered rollers and supporting the shaft with respect to the casing, a screwthreaded member screwthreadedly engaged with a screwthreaded portion of the casing for axially prestressing the bearings, and a sealing device for affording a seal between the casing and the screwthreaded member, said sealing device comprising means defining a substantially radial aperture in the casing, which aperture communicates with the screwthreaded member and with an outer face of the casing, plug means of compressible material disposed in the aperture and in contact with the screwthread of the screwthreaded member, first means compressing the plug means against the screwthread of the screwthreaded member and retaining the plug means, and second means maintaining the first means in position in the aperture.

2. A device as claimed in claim 1, wherein the compressible material is rubber having a hardness not exceeding medium hardness.

3. A device as claimed in claim 1, wherein the compressible material is plastics material having a closed cellular structure.

4. A device as claimed in claim 1, wherein a plug means comprises a plurality of adjoining discs.

* * * * *